United States Patent
Murata et al.

(10) Patent No.: US 6,744,161 B2
(45) Date of Patent: Jun. 1, 2004

(54) VEHICLE ALTERNATOR HAVING IMPACT AND VIBRATION RESISTANT TERMINAL CONNECTION

(75) Inventors: Nakato Murata, Nagoya (JP); Yoshiki Tan, Anjo (JP); Shinichi Matsubara, Anjo (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/231,172

(22) Filed: Aug. 30, 2002

(65) Prior Publication Data

US 2003/0062781 A1 Apr. 3, 2003

(30) Foreign Application Priority Data

Sep. 28, 2001 (JP) ........................................ 2001-302105

(51) Int. Cl.⁷ .............................................. H02K 11/00
(52) U.S. Cl. ........................................ 310/71; 439/874
(58) Field of Search ........................ 310/71, 270, 201; 439/809, 810, 874, 877

(56) References Cited

U.S. PATENT DOCUMENTS

| | | | |
|---|---|---|---|
| 3,777,051 A | * 12/1973 | Ziegler et al. | ............. 174/94 R |
| 5,682,070 A | 10/1997 | Adachi et al. | ................. 310/71 |
| 5,914,546 A | 6/1999 | Terakado et al. | .............. 310/71 |
| 6,160,335 A | 12/2000 | Ishida et al. | ............... 310/68 D |
| 6,369,474 B1 | * 4/2002 | Tanaka et al. | .................. 310/71 |
| 6,424,071 B1 | * 7/2002 | Oohashi et al. | ............. 310/180 |
| 6,429,556 B1 | * 8/2002 | Nakamura et al. | ............. 310/71 |

FOREIGN PATENT DOCUMENTS

| | | | | |
|---|---|---|---|---|
| JP | U 62-198864 | 12/1987 | .......... H02K/19/36 |
| JP | U 5-15653 | 2/1993 | ............. H02K/3/50 |
| JP | A 2000-350426 | 12/2000 | .......... H02K/19/36 |

\* cited by examiner

Primary Examiner—Burton S. Mullins
Assistant Examiner—Nguyen Hanh
(74) Attorney, Agent, or Firm—Oliff & Berridge, PLC

(57) ABSTRACT

A vehicle alternator has an armature coil, a rectifier, and a terminal connector. The armature coil has a substantial rectangular cross-section. The rectifier rectifies a voltage induced at the armature coil. The terminal connector includes a crimping portion and a connecting portion. The crimping portion is crimped onto a lead of the armature coil. The connecting portion is fixed to an input terminal of the rectifier with a screw. The crimping portion of the terminal connector is crimped onto the lead so that two opposed surfaces of the lead have surface contact with the terminal connector.

14 Claims, 5 Drawing Sheets

VEHICLE ALTERNATOR HAVING IMPACT AND VIBRATION RESISTANT TERMINAL CONNECTION

CROSS REFERENCE TO RELATED APPLICATION

This application is based on and incorporates herein by reference Japanese Patent Application No. 2001-302105 filed on Sep. 28, 2001.

FIELD OF THE INVENTION

The present invention relates to a vehicle alternator having impact and vibration resistant terminal connection.

BACKGROUND OF THE INVENTION

In a vehicle alternator, an AC voltage induced at an armature coil is rectified to a DC voltage by a rectifier. The armature coil and rectifier are connected by soldering, welding, or utilizing a terminal connector attached to leads (lead-out wires) of the armature coil.

A vehicle alternator having a terminal connector crimped onto lead-out wires of armature coil is disclosed in U.S. Pat. No. 5,914,546 (JP-A-10-4646). Each lead-out wire has a round cross-section and the terminal connector is crimped onto a plurality of lead-out wires. Therefore, a contact area between each lead-out wire and terminal connector is insufficient. To augment electrical conductivity, solder or brazing filler metal is filled in the space around the lead-out wire.

In recent years, vehicle engines are reduced in weight and increased in power output. As a result, engines cause high vibration, resulting in severe condition of space in which the alternator is installed. Moreover, solder or brazing filler metal deteriorates over time. This may cause poor electrical connection between the lead-out wires and terminal.

The terminal connector requires space to provide the solder or brazing filler metal around the lead-out wires inside the crimping portion. Because of the space, the lead-out wire may not be placed in a proper position for crimping when it is inserted in the crimping portion. In such a case, the terminal connector is not properly crimped onto the lead-out wire and insufficient electrical connection may occur.

To counter the above problems, the lead-out wire may be deformed to a rectangular cross-section when crimping the terminal connector onto the wire. By deforming the lead-out wire to a rectangular cross-section, sufficient contact area is provided. However, this may cause broken wire because stress is applied to the deformed area when vibration occurs. Therefore, this alternative is not appropriate for practical application.

SUMMARY OF THE INVENTION

The present invention therefore has an objective to provide a vehicle alternator in which contact failure minimally occurs even under severe installation conditions.

A vehicle alternator of the present invention includes a stator, a rectifier, and terminal connectors. The stator has a stator core and an armature coil wound around the stator core. The armature coil has a rectangular cross-section. The rectifier converts an AC voltage induced at the armature coil to a DC voltage. The terminal connector has a crimping portion and a connecting portion. The crimping portion is used for crimping a lead (lead-out wire) of the armature coil. The connecting portion is connected to an input terminal of the rectifier with a screw.

When the terminal connector is crimped onto the lead-out wire, opposed surfaces of the lead-out wire have surface contact with the crimping portion of the terminal connector. As a result, sufficient contact area is provided with a minimal amount of plastic deformation of the lead-out wire. This reduces the occurrence of connection failures under the severe installation condition. This also reduces an amount of solder or brazing filler metal. The solder or brazing filler metal may not be needed if the crimping portion is well designed so that the lead-out wire has better surface contact with the terminal connector.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1:
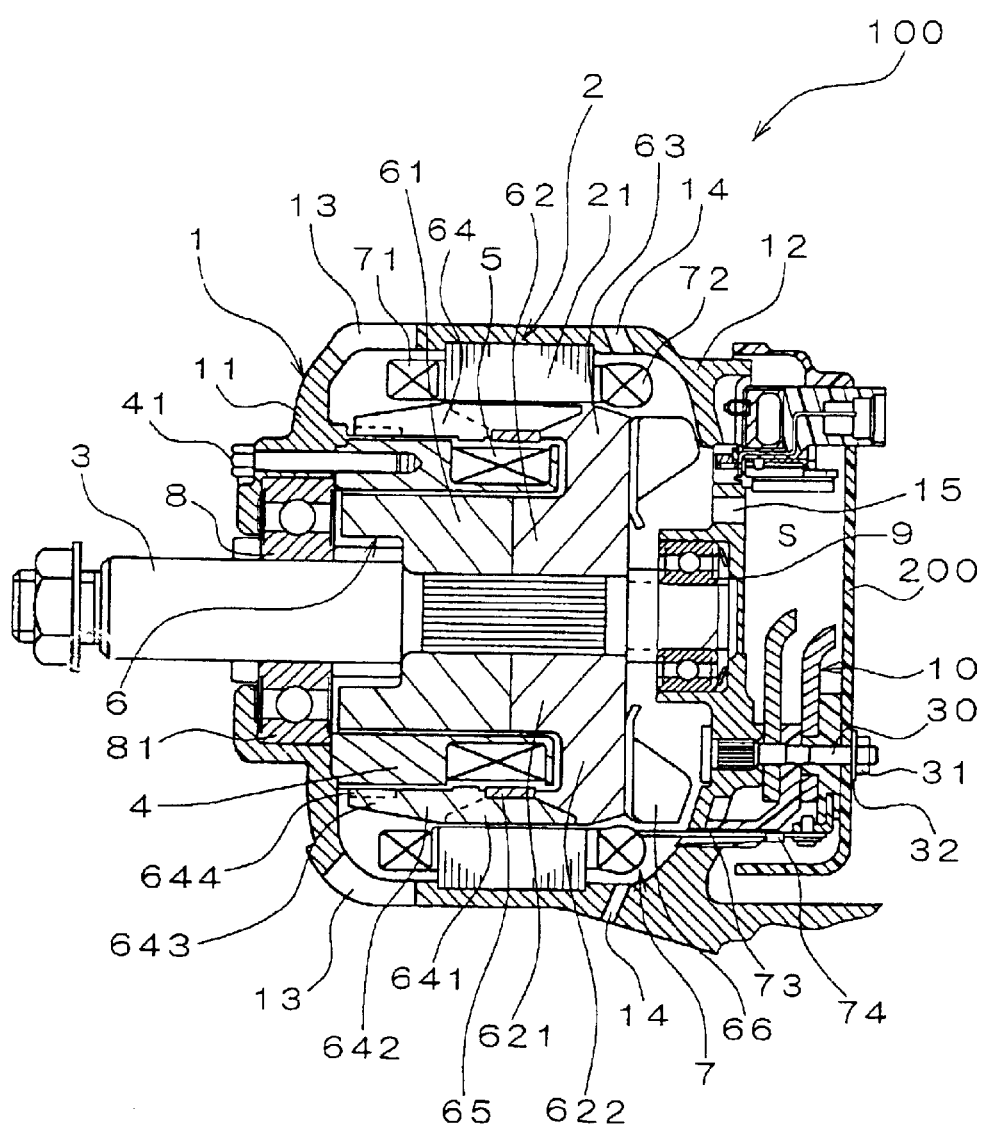
FIG. 1 is a cross-sectional view of an alternator according to an embodiment of the present invention.

Referring to FIG. 1, an alternator 100 includes a frame 1, a stator 2, a rotor shaft 3, a stationary yoke 4, a field coil 5, a rotor core 6, bearings 8 and 9, and a rectifier 10.

The stator 2 includes a stator core 21 and an armature coil 7 wound around the stator core 21. The stator core 21 is made of steel sheets and fixed to a cylindrical interior wall of the frame 1. A number of slots are provided on the interior wall of the stator core 21 for receiving the armature coil 7 therein.

Figure 2:
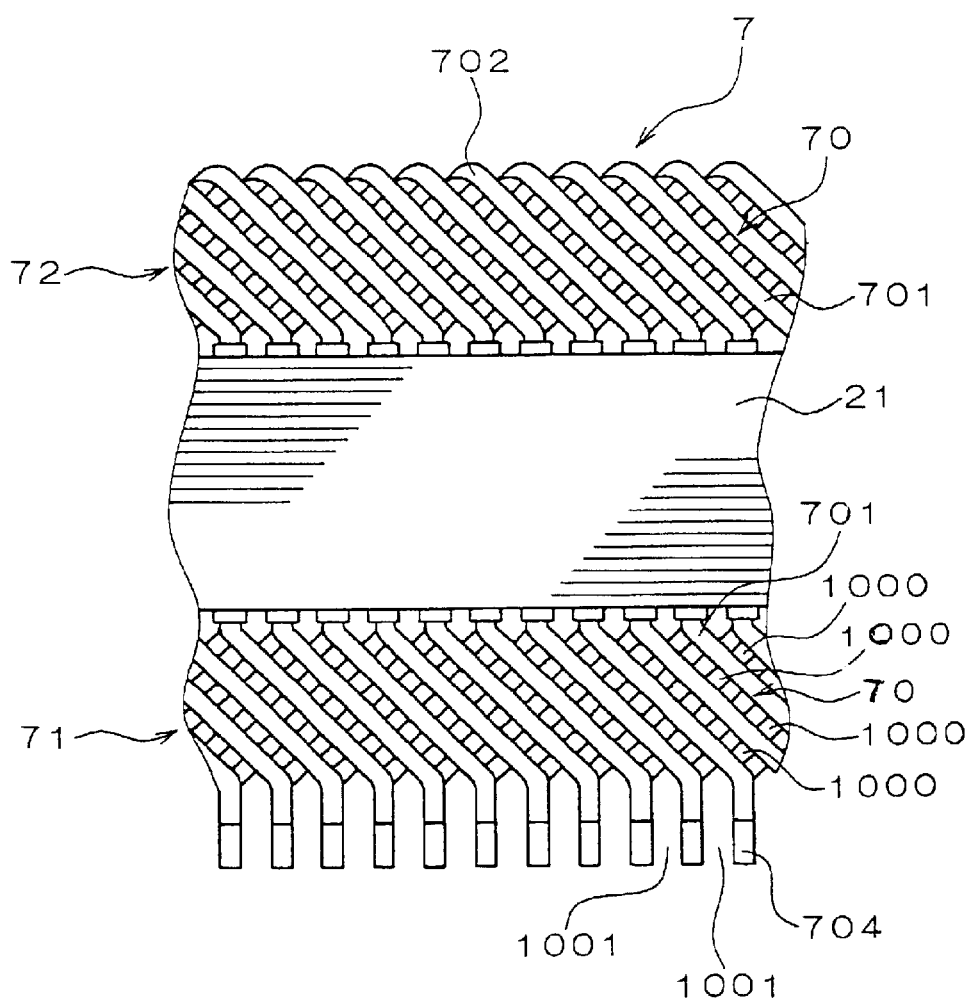
FIG. 2 is a plain view of a part of the stator according to the embodiment.
Figure 3:
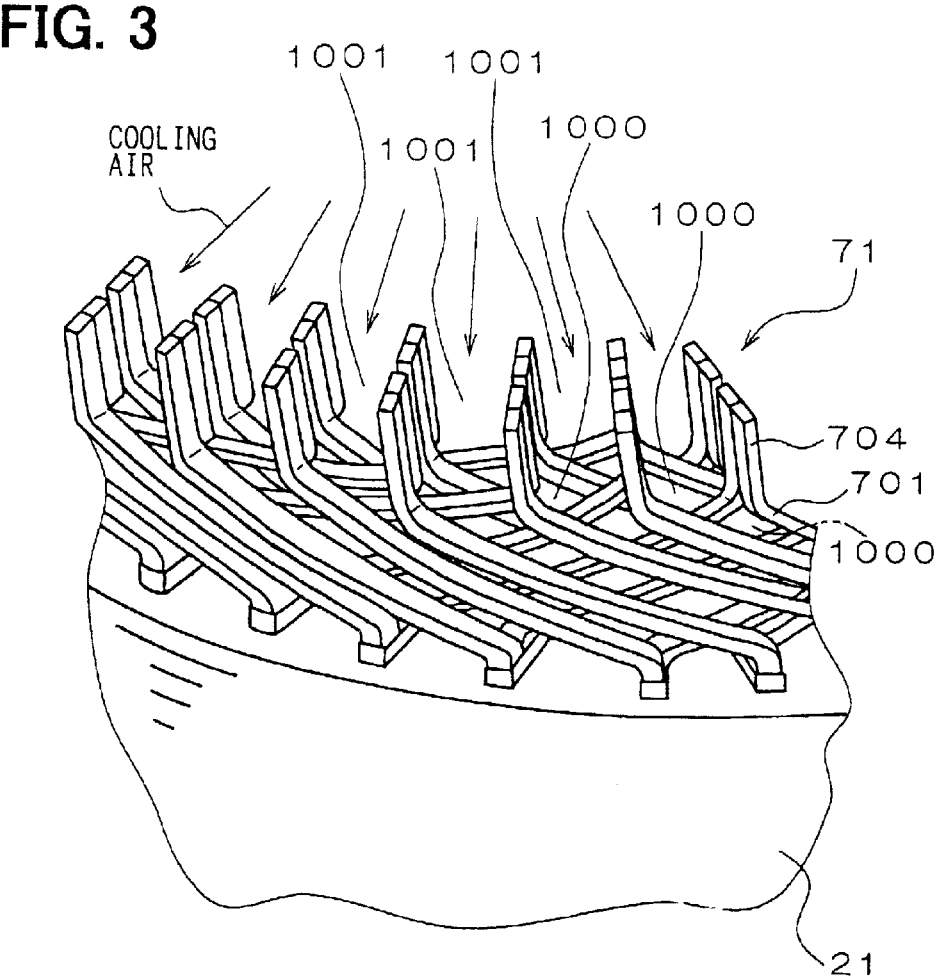
FIG. 3 is a perspective view of a part of the stator according to the embodiment.

Referring to FIGS. 2 and 3, the armature coil 7 is constructed of a plurality of U-shaped segment conductors 70. Each U-shaped segment conductor 70 has a pair of straight portions 701 and a curved portion 702. Each straight portion 701 is inserted into one of slots provided with a predetermined pitch in the stator core 21. An end portion 704 of the segment conductor 70 is bent in the circumferential direction to a specified position and connected with an end portion 704 of other segment conductor 70 so that three-phase windings are constructed.

Figure 4:
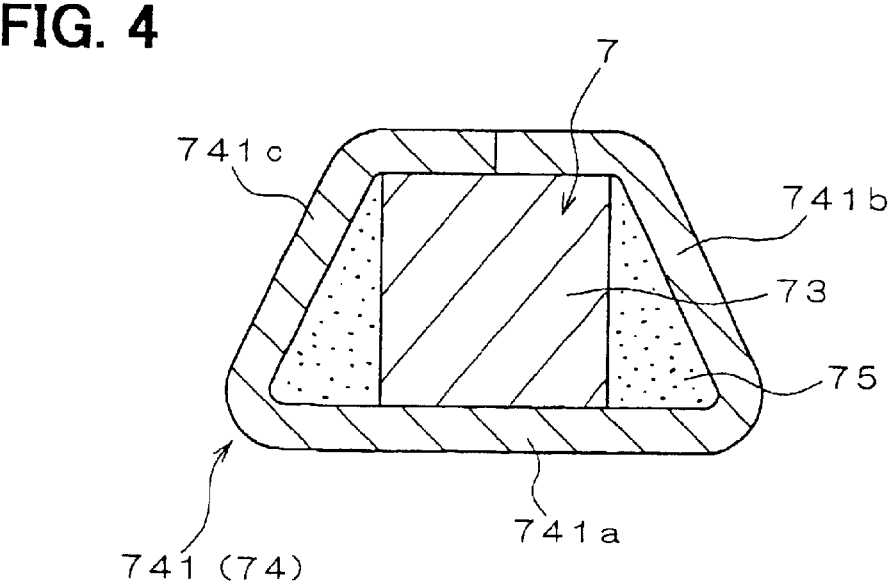
FIG. 4 is a cross-sectional view of a lead-out wire on which a terminal connector is crimped according to the embodiment.

A lead-out wire 73 is extended from the curved potion side (right side in FIG. 2) of the stator 2 in parallel with the rotor shaft 3 and connected to the rectifier 10. A terminal connector 74 is crimped onto the end of the lead-out wire 73. The lead-out wire 73 has a cross-sectional shape of rectangle as shown in FIG. 4. The terminal connector 74 is crimped on the lead-out wire 73.

Figure 5:
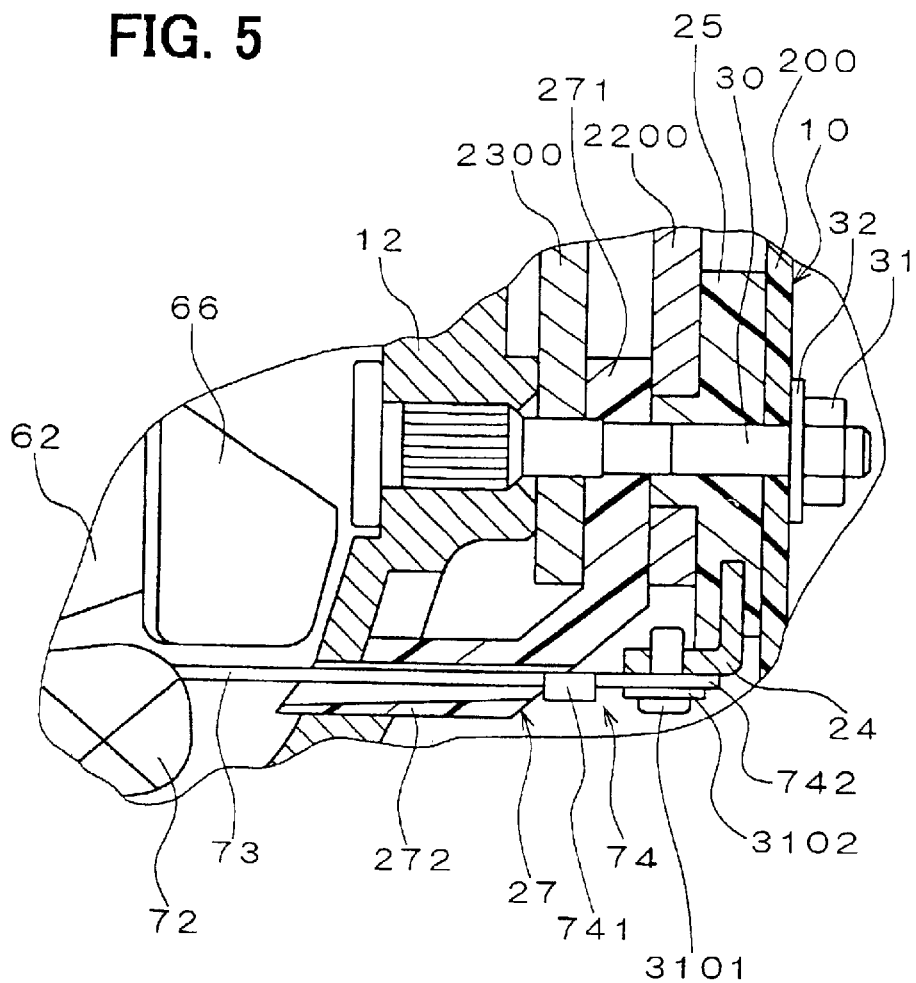
FIG. 5 is a enlarged cross-sectional view of a part of the alternator around the terminal connector according to the embodiment.

Referring to FIGS. 4 and 5, the terminal connector 74 has a crimping portion 741 and a connecting portion 742. The connecting portion 742 is fixed to the input terminal 24 with a screw 3101 via a washer 3102. The crimping portion 741 is crimped onto the lead-out wire 73. When the crimping is completed, the cross-section of the crimping portion 741 becomes as shown in FIG. 4. The cross-section is a trapezoid and the upper base is approximately same length with the width of the lead-out wire 73. This enables proper positioning of the lead-out wire 73 in the crimping portion 741.

The crimping portion 741 has a bottom portion 741a and claw portions 741b and 741c. The claw portions 741b and 741c are bent and a force is applied in the vertical direction of FIG. 4 so that they are pressed against the top surface of the lead-out wire 73. At the same time, the bottom portion 741a is pressed against the bottom surface of the lead-out wire 73. As a result, both claw portions 741b and 741c are in surface contact with the top surface of the lead-out wire 73 and joined to each other at the same time.

The crimping portion 741 and lead-out wire 73 have a trapezoid cross-section and a rectangular cross-section, respectively. Therefore, a space defined by the crimping portion 741 and lead-out wire 73 has a triangle cross section. This space is referred to as a triangle space 75 in FIG. 4. By filling the triangle space 75 with solder or brazing filler metal, electrical contact resistance between the lead-out wire 73 and terminal connector 74 can be reduced.

Figure 6:
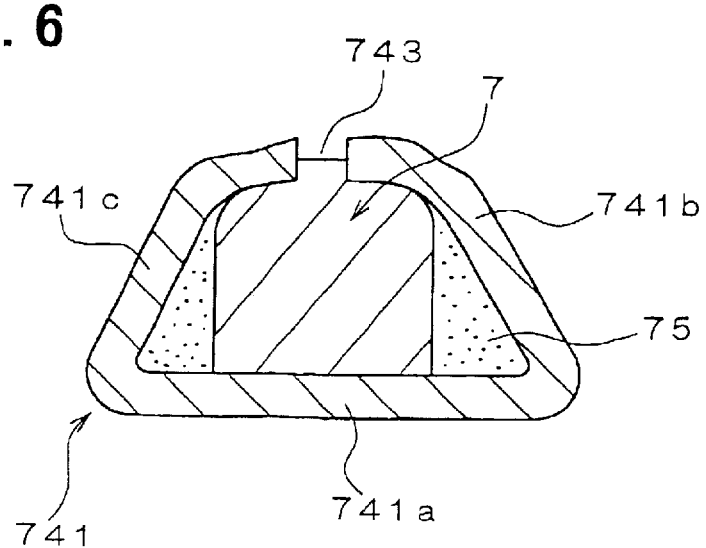
FIG. 6 is a cross-sectional view of the lead-out wire on which a modified terminal connector is crimped according to the embodiment.

A modified terminal connector is shown in FIG. 6. A gap 743 is provided between two claw portions 741b and 741c. The lead-out wire 73 is plastically deformed and a part of it is placed in the gap 743 when bending the claw portions 741b and 741c for crimping. This decreases a size of space between the lead-out wire 73 and terminal connector 74. As a result, the contact resistance between them can be reduced. Moreover, the lead-out wire 73 can be properly positioned in the crimping portion 741 by placing a part of the lead-out wire 73 in the gap 743. This ensures a stable connecting condition.

Front coil end 71 and rear coil end 72 are constructed of U-shaped segment conductors 70 as shown in FIGS. 2 and 3. The straight portions 701 of the U-shaped segment conductors 70 are in diagonal position relative to the circumference of the stator core 21 and parallel to each other. As a result, a number of air passages 1000 in a cross-sectionally diamond shape are uniformly formed in both the radial and axial directions. In the coil end 71, the end portions 704 are extended in the axial direction so that they are fixed to each other. As a result, radial directional air passages 1001 are formed between the end portions 704. Each segment conductor 70 never overlaps in the radial or axial direction. Therefore, all segment conductors 70 can be cooled down with a small loss of fluid resistance when ventilation is performed in the radial or axial direction.

The rotor shaft 3 is supported by a front-end wall 11 via the bearing 8 and by a rear-end wall 12 via the bearing 9. A pulley (not shown) is fixed to the outside of the front-end wall 11 with a nut.

The stationary yoke 4 is a cylinder-shaped soft iron core that surrounds the rotor shaft 3 and fixed to the front-end wall 11 with a bolt 41. The stationary yoke 4 has a groove around its outer wall near the front end. The field coil 5 is wound around the stationary yoke 4 in the groove.

The rotor core 6, which is fixed to the rotor shaft 3, provides a magnetic path for field flux along with the stationary core 4. The rotor core 6 includes a pair of rotor yokes 61 and 62, a plurality of first claw poles 63 and second claw poles 64, and a supporting member 65. The rotor yokes 61 and 62 are placed closer to each other in the axial direction and fixed to the rotor shaft 3. The claw poles 63 and 64 are integrated with the rotor yoke 62. The supporting member 65 is a ring made of non-magnetic material. The supporting member 65 is used for integration of the first and second claw poles 63 and 64.

The rotor yoke 61 is a cylindrical-shaped soft iron core. Its outer wall faces the inner wall of the stationary yoke 4 with a small gap. The other rotor yoke 62 is also a cylindrical-shaped soft iron core. The rotor yoke 62 has two portions, first core portion 621 and second core portion 622. The first core portion 621 is located inside the stationary yoke 4 with a small gap in between and its periphery faces the inner wall of the stationary yoke 4. The second core portion 622 is located behind the first core portion 621 and its diameter is larger than the interior diameter of the stator yoke 4.

Each claw of the first claw poles 63 is extended from the core portion 622 in the axial direction as if the claw is attached to the outer wall of the rotor core 62. The claws, provided with constant pitches in the circumferential direction, are inserted into claw pole storing space defined by the inner wall of the stator core 21 and the outer wall of the field winding 5. A cooling fan 66, which generates cooling air flowing in the axial and centrifugal directions, is fixed to the top of the rotor core 62. The top of the rotor core 62 is positioned inwardly compared to the rear coil end 72.

Each claw of the second claw poles 64 is located outside the stationary yoke 4 with a small gap in between and its inner wall faces the outer wall of the stationary yoke 4. The claw is provided in between the first claw poles 63 circumferentially lined and extended in the axial direction so that it is inserted into the claw pole storing space. The second claw poles are arranged with constant pitches in the circumferential direction. The second claw poles 64 include an active pole portion 641 and an elongated portion 642.

The elongated portion 642 includes wings 643 that also functions as magnetic paths of field flux. The elongated portion 642 also includes a tube-shaped member that connects the wings 643 together. The elongated portion is located outside the stationary yoke 4 with a small gap in between and its inner wall faces the outer wall of the stationary yoke 4.

The frame 1 has air discharge holes 13 and 14, and an air intake hole 15. The air discharge holes 13 and 14 are located near the coil ends 71 and 72, and the air intake hole 15 is located on a rear-end wall 12. The bearing 8 is fixed by partially attaching its rear-end surface to the front-end surface of the stationary yoke 4.

The rectifier 10 is fixed to the frame 1 with a nut 31 and a bolt 30 that penetrates the rear-end wall 12 of the frame 1. The rectifier 10 includes a group of diodes (not shown), positive cooling fins 2200, negative cooling fins 2300, an insulator 27, and a terminal holder 25. The diodes perform full-wave rectification on AC voltage outputs of the armature coil 7. Among the diodes, positive diodes are cooled by the positive cooling fins 2200 and negative diodes are cooled by the negative cooling fins 2300. The insulator 27 is made of electrical insulating material. The terminal holder 25 holds the input terminal 24.

The bolt 30 holds the negative cooling fin 23000, a middle insulator 27, the positive cooling fin 2200, and terminal holder 25 in this order from the real-end wall 12. Then, the rear cover 200 is placed and the bolt is fixed with the nut 31 and washer 32.

The insulator 27, which is made of insulating resin, includes the middle insulator 271 and lead-out wire insulator 272. The middle insulator 271, substantially plate-shaped, electrically isolates the positive cooling fin 2200 from the negative cooling fin 2300. The lead-out wire insulator 272 is a tube-shaped member extended from an edge of the middle insulator 271 toward the front in the axial direction. The lead-out wire insulator 272 is inserted into a through-hole on the frame 1. When the lead-out wire 73 is drawn through the lead-out wire insulator 727, it is electrically isolated from the frame 1.

A voltage is induced at the armature coil 7 by rotating the rotor core 6 and feeding a field current to the field winding 5. The induced voltage is applied to the rectifier 10 via the lead-out wire 73 and rectified to a DC voltage.

The cooling fan 66 is rotated with the rotor core 6. Therefore, cooling air currents flow through a space between the rear cover 200 and rear-end wall 12, or a parts chamber S via the intake hole on the rear cover 200. Then, the cooling air currents flow into the frame 1 via the intake hole 15 and branches into the axial direction and the centrifugal direction. The cooling air currents that flow in the axial direction mainly flow toward the stationary yoke 4 through a space between the claw poles 63 and 64. The cooling air cools down the coil end 71 then exits from the frame 1 via the discharge hole 13. The cooling air currents that flows in the centrifugal direction cools down the coil end 72 and exits from the frame 1 via the discharge hole 14.

The present invention produces effects discussed below.

The terminal connector 74 is crimped on the lead-out wire 73. The lead-out wire 73 and terminal connector 74 have surface contact. Therefore, sufficient contact areas can be provided while the plastic deformation of the armature coil 7 is maintained at lower level. This reduces poor connection caused in severe install conditions. This also reduces a total amount of solder or brazing filler metal used for sufficient electrical conductance.

The solder or brazing filler metal may not be needed if crimping portion is well designed for good electrical connection. This reduces manufacturing cost. However, as shown in FIGS. 4 and 6, it is desirable that the space 75 is provided between the crimping portion 741 and lead-out wire 73 for solder or brazing filler metal. Since the solder or brazing filler metal improves electrical conductance, a contact resistance can be reduced by providing solder or brazing filler metal in the space. As a result, poor connections can be reduced. Moreover, the lead-out wire 73 requires smaller space for solder or brazing filler metal than known lead-out wires having round cross-sections. In other words, the lead-out wire 73 requires smaller amount of solder or brazing filler metal. Therefore, the manufacturing cost can be reduced.

The crimping portion 741 has the bottom portion 741a and claw portions 741b and 741c. The claw portions 741b and 741c are located at sides of the bottom portion 741a, respectively. The claw portions 741b and 741c are bent so that they touch each other. With the claw portions 741b and 741c, the terminal connector 74 can be securely crimped on the lead-out wire 73.

The armature coil 7 is constructed of U-shaped segment conductors 70. Three-phase windings are constructed by connecting one end of the segments 70 one another after the segments 70 are inserted into slots of the stator core 21. Therefore, the terminal connector 74 can be crimped before the armature coil 7 is inserted into the stator core 21. This improves flexibility in designing of manufacturing processes. In comparison to known wave winding coil having round cross-section, a resistance in the three-phase windings can be greatly reduced. This reduces heat deterioration of the solder or brazing filler metal and improves reliability.

The present invention should not limited to the embodiment previously discussed and shown in the figures, but may be implemented in various ways without departing from the spirit of the invention.

Figure 7:
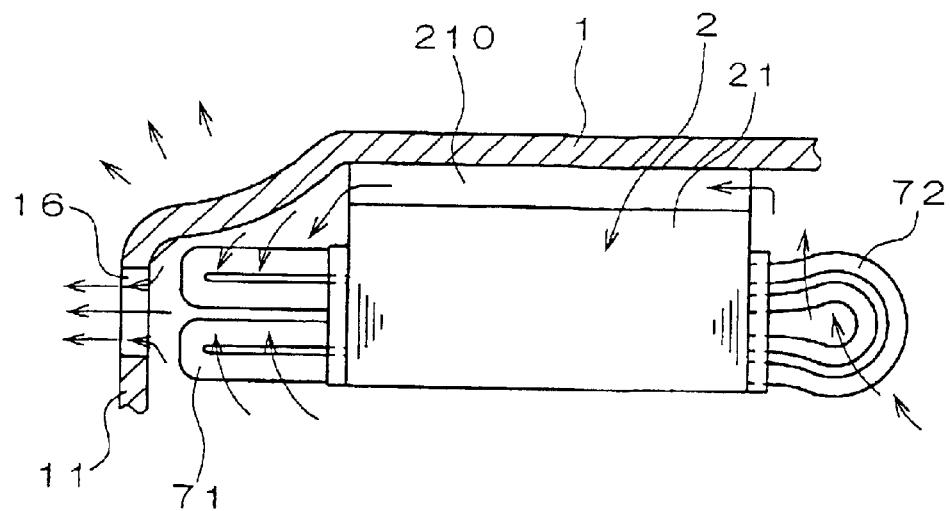
FIG. 7 is a cross-sectional view of the lead-out wire on which a modified terminal connector is crimped.
Figure 8:
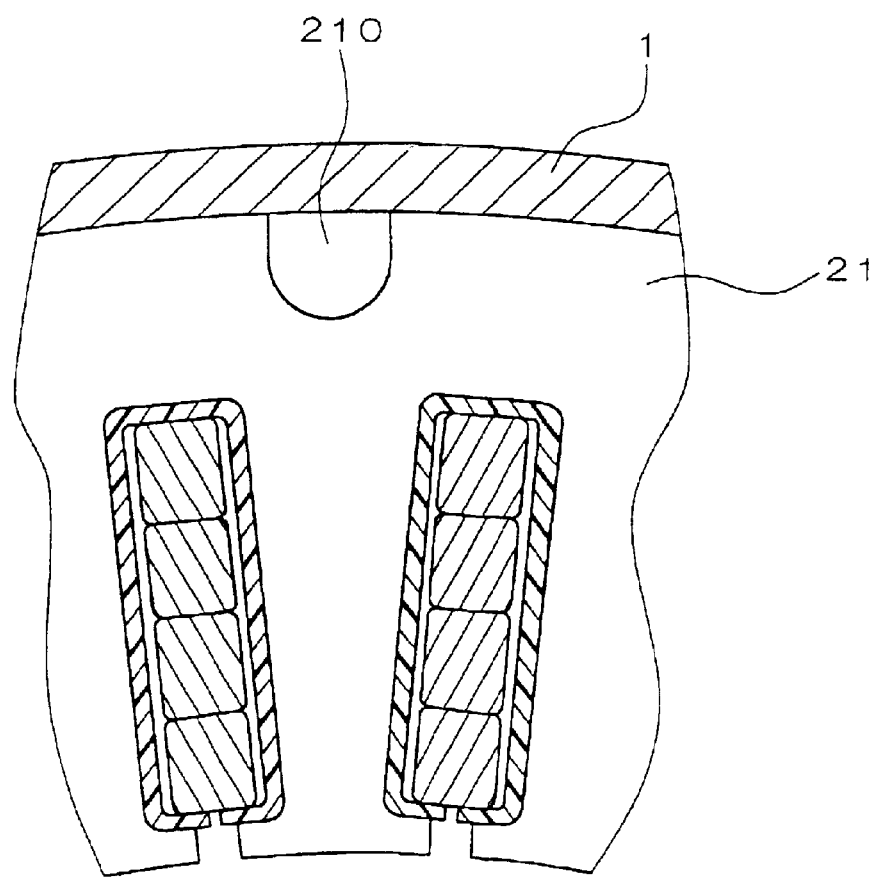
FIG. 8 is a cross-sectional view of the alternator having the lead-out wire and terminal connector shown in FIG. 7.

A vehicle alternator shown in FIGS. 7 and 8 has axial direction drains 210 on the outer wall of the stator core 21 for the same number as the slots. To smooth flows of the cooling air currents through the axial direction drains 210, a discharge hole 16 is provided more to the front than the discharge hole 13 shown in FIG. 1. The cooling air currents generated by the cooling fan 66 flow in the centrifugal direction and cool down the coil end 72. Then, the cooling air currents flow in the axial direction and through the axial direction drains 210 to the coil end 71. The cooling air currents flow through the coil end 71 in the radius direction or toward the front while cooling down the coil end 71 and exits from the frame 1 through the discharge hole 16. By increasing the amount of the cooling air currents around the coil end 71, the stator 2 is cooled down more easily.

Holes may be provided in the axial direction on the stator core 21 for the airflow instead of the axial direction drains 210.

This invention may be applied to a vehicle alternator having brushes and field windings that rotate with a rotor.

What is claimed is:

1. A vehicle alternator comprising:
   a stator core;
   an armature coil wound around the stator core and having a lead shaped in a substantial rectangular cross-section;
   a rectifier for rectifying an alternating current voltage induced at the armature coil to a direct current voltage; and
   a terminal connector having a crimping portion crimped exclusively onto the lead of the armature coil and a connecting portion fixed to an input terminal of the rectifier,
   wherein the lead has two pairs of opposed surfaces and one of the pairs is in surface contact with the terminal connector and the other pair of opposed surfaces is away from the terminal connector.

2. The vehicle alternator as in claim 1, wherein a space for jointing material having electrical conductivity is provided between the other pair of opposed surfaces and the terminal connector.

3. The vehicle alternator as in claim 2, wherein the space in which the lead is inserted has a substantially trapezoid cross-section.

4. The vehicle alternator as in claim 3, wherein a shorter base of the substantially trapezoid cross-section and a part of the lead in line contact with the shorter base are an approximately same length.

5. The vehicle alternator as in claim 2, wherein the space is filled with jointing material having electrical conductivity.

6. The vehicle alternator as in claim 1, wherein the crimping portion includes a bottom portion in surface contact with one of the opposed surfaces of the lead and claw portions extending from both sides of the bottom portion.

7. The vehicle alternator as in claim 6, wherein one of the opposed surfaces of the lead is plastically deformed.

8. The vehicle alternator as in claim 7, wherein:

ends of the claw portions face each other with a gap; and a part of the opposed surface that is plastically deformed is placed in the gap.

9. The vehicle alternator as in claim 1, wherein:

the armature coil is constructed of substantially U-shaped segment conductors and having a rectangular cross-section;

the segment conductors are connected to form multiple-phase windings and inserted in slots of the stator core.

10. The vehicle alternator as in claim 1, wherein the opposed surfaces are in direct surface contact with the terminal connector over substantially entire areas thereof.

11. A vehicle alternator, comprising:

a stator core;

an armature coil wound around the stator core and having a lead shaped in a substantial rectangular cross-section;

a rectifier for rectifying an alternating current voltage induced at the armature coil to a direct current voltage; and a terminal connector having a crimping portion crimped exclusively onto the lead of the armature coil and a connecting portion fixed to an input terminal of the rectifier, wherein the lead has two pairs of opposed surfaces and one of the pairs is in surface contact with the terminal connector and the other pair of opposed surfaces is away from the terminal connector to provide a space for jointing material having electrical conductivity.

12. The vehicle alternator as in claim 11, wherein the space in which the lead is inserted has a substantially trapezoid cross-section.

13. The vehicle alternator as in claim 11, wherein a shorter base of the substantially trapezoid cross-section and a part of the lead in line contact with the shorter base are an approximately same length.

14. The vehicle alternator as in claim 11, wherein the space is filled with jointing material having electrical conductivity.

* * * * *